United States Patent Office 3,522,222
Patented July 28, 1970

3,522,222
CURING OLEFIN POLYMERS WITH ORGANIC PEROXIDES AND POLYVALENT METAL SALTS OF ACRYLIC AND METHACRYLIC ACIDS
Ray D. Taylor, Brecksville, Ohio, assignor to The B. F. Goodrich Company, New York, N.Y., a corporation of New York
No Drawing. Continuation-in-part of application Ser. No. 491,376, Sept. 29, 1965. This application Sept. 19, 1968, Ser. No. 760,978
Int. Cl. C08f 15/40
U.S. Cl. 260—80.78                   10 Claims

ABSTRACT OF THE DISCLOSURE

In the cure of elastomeric α-olefin polymers such as copolymers of ethylene and propylene with organic peroxides, vulcanizates having improved physical properties are obtained when polyvalent metal salts of acrylic and/or methacrylic acids are employed in conjunction with the organic peroxide. Improved adhesion of α-olefin polymers to non-primed metal surfaces is also obtained when the polymers contain organic peroxides and the polyvalent metal salts of acrylic or methacrylic acids.

CROSS REFERENCE TO RELATED APPLICATION

This is a continuation in part of my copending application Ser. No. 491,376, filed Sept. 29, 1965, now abandoned.

BACKGROUND OF THE INVENTION

α-Olefin polymers such as copolymers of ethylene and propylene which have rubbery or elastomeric properties are commercially available. One of the known and useful methods for curing or vulcanizing such polymers is through use of organic peroxides. Further improvement in such curing systems and in the physical properties of the resulting vulcanizates is desirable. Improvement whereby reduced amounts of the organic peroxide are used is also desirable.

The prior art suggested that the vulcanization rate of α-olefin polymers with organic peroxides could be enhanced through the use of acidic substances such as acrylic acid, maleic anhydride and the like which were considered to be grafted onto the polymer chains. The use of metal oxides such as zinc oxide and aluminum oxide as additional compounding ingredients was also suggested. The use of acrylic acid is objectionable because of its toxicity and volatility. Further, as a liquid it is difficult to disperse in elastomeric compounds either on a mill or in a Banbury mixer, where the problems of toxicity are enhanced because of the heat generated during the compounding of the polymers.

SUMMARY OF THE INVENTION

I have now found quite unexpectedly that the cure of α-olefin polymers with an organic peroxide may be accelerated and that lesser amounts of organic peroxide are required and vulcanizates obtained having improved physical properties when polyvalent metal salts of acrylic acid or methacrylic acid are employed in conjunction with the organic peroxide. An additional unexpected advantage obtained with the novel curing system for α-olefin polymers in accordance with this invention is improved adhesion of α-olefin polymer compounds to metal surfaces.

DETAILED DESCRIPTION

α-Olefin polymers are normally prepared for α-olefins containing 2 to 10 carbon atoms. It is usually preferred to prepare rubbery or elastomeric poly(α-olefins) from olefins containing 2 to 5 carbon atoms. Ethylene, propylene and butene-1 and mixtures thereof are particularly useful. Rubbery poly(α-olefins) which contain olefinic unsaturation also are readily vulcanized when the polyvalent metal salts of acrylic acid or methacrylic acid are used with organic peroxides as the curing agents. Unsaturated polymers of α-olefins are prepared by polymerizing the α-olefin with aliphatic and alicyclic polyenes containing 4 to 10 carbon atoms and at least two $>C=C<$ groups. Preferred interpolymers contain ethylene and at least one other α-olefin preferably containing from 3 to 5 carbon atoms. Usually such polymers contain about 50 mol percent or more of ethylene and such polymers may also contain less than 20% of a polyene. Particularly useful are elastomeric interpolymers containing less than 80 mol percent ethylene, at least 5 mol percent of another α-olefin such as propylene and butene-1; and polymers also containing a polyene in amounts to provide in the interpolymer, olefinic-unsaturation represented by an iodine number of from about 2 to about 35. Of course, the major advantage of the novel cure system of this invention is that completely saturated polymers of α-olefins are readily vulcanized without the necessity of having unsaturation or other reaction sites available in the polymers. Such polymers include those of ethylene and propylene; ethylene and butene-1; propylene and butene-1; ethylene, propylene and butene-1; ethylene and methylbutene; ethylene and 4-methyl pentene and the like. Unsaturated interpolymers include, for example, polymers containing a major proportion of ethylene, a lesser proportion of propylene and 0.1 to 10% of 1,4-hexadiene, dicyclopentadiene, butadiene, the norbornenes, 1,4,9-decatriene, methyl heptadiene, cyclooctadiene, cyclodecadiene, 1,4-pentadiene and the like.

The elastomeric interpolymers are prepared by polymerizing the monomers with catalysts which contain at least two esesntial components. The first component is a compound of a reducible transition heavy metal of Groups IV, V, and VI of the Periodic Table, including particularly, titanium, zirconium, and vanadium, normally in the form of halides, oxyhalides and alcoholates. Such catalysts include $Ti(OR)_4$ wherein R is alkyl, $TiCl_4$, $VCl_4$, $VAc_3$, $VOCl_3$, vanadyl acetylacetonate and the like. The second component of the catalyst system are metals and compounds of Groups I, II, and III of the Periodic Table, preferably lithium, sodium, magnesium, and aluminum, as the free metal, hydrides and organo-metallic compounds thereof. In the organo-metallic compounds, at least one valence bond should connect the metal with an organic radical. Such materials include lithium alkyls, aluminum trialkyls, aluminum dialkyl monohalides, aluminum monoalkyl dihalides, lithium hydride, aluminum hydride, aluminum alkyl hydrides, mixtures thereof, and the like. Preferred catalysts contain titanium tetrachloride or vanadyl oxychloride and alkyl aluminum halides, preferably the mono- and di-chlorides. The alkyl groups of the latter component will contain from 2 to 8 and preferably from 2 to 4, carbon atoms. Normally the Group III metal compound will be present in molar excess in relation to the titanium or vanadium halide.

The polymerization reactions may be conducted in batch or continuous process and equipment. As is known, the equipment and monomers employed must be essentially free of oxygen, water and other polar compounds when the monomers are polymerized with a metal alkyl reduced titanium or vanadium catalyst. Solvents may be used, if desired, and they are normally treated to remove oxygen and water. Useful solvents include the aromatic hydrocarbons such as benzene, toluene, and the like. Chlorinated hydrocarbons such as perchloroethylene have been found to be very usefull. Aliphatic hydrocarbons such as heptane and hexane also are useful.

The temperature and pressure for the polymerization reaction may be varied quite widely. Temperatures of polymerization may be varied from any temperature above the freezing point of the polymerization mixture to a temperature just below the boiling point of the reaction mixture. Excellent results have been obtained in the range of about −20° C. to about 25° C. In the same manner, while satisfactory polymerizations have been obtained at atmospheric pressure or at pressures of only a few pounds, the polymerization may be carried out at very high pressures.

Any polyvalent metal salt of acrylic and methacrylic acid may be used in the organic peroxide cure of α-olefin polymers. Preferred are polyvalent metal salts of metals of Groups II–A, II–B, III–A, IV–A, IV–B, V–A, V–B, VI–B, VII–B, and VIII of the Periodic Table. Salts of magnesium, calcium, barium, titanium, vanadium, chromium, iron, cobalt, nickel, cadmium, lead, tin, zinc, and aluminum have been found to be useful.

Organic peroxides used to cure polymers of alpha-olefins include a great variety of materials for example, dicumyl peroxide, dibenzoyl peroxide, di-t-butyl peroxide, methylethyl ketone peroxide, t-butyl perbenzoate, cumene hydroperoxide, 2,5 - dimethyl - 2,5 - di - t - butyl peroxyhexane, diisopropyl peroxide and the like. It is believed that aryl peroxides and hydroperoxides are more efficient. The amount of organic peroxide curing agent used may be varied over a wide range depending upon the degree of cure required, the nature of the polymer being cured, and other known factors. Normally, smaller amounts are required with polymers containing unsaturation and other reactive crosslinking sites. It has been found that when the polyvalent metal acrylate and methacrylates are used with the organic peroxide curing agent that smaller amounts of the organic peroxide may be used as compared to use of the organic peroxide alone.

Normally the amount of organic peroxide will be greater than 0.1% and usually between 0.5 and 10 parts by weight per 100 parts of polymer. The amount of polyvalent metal acrylate and/or methacrylate will be varied from about 1 to 30 weight parts per 100 weight parts of polymer. Even better results are obtained with about 0.5 to 3 parts of peroxide and 5 to 20 parts of polyvalent metal acrylate. More preferably, less than 10 parts of metal acrylate are employed for the best balance of desirable properties. The ratio of metal acrylate to peroxide for best adhesive properties should be greater than 1, preferably above about 5 to 2, to 20 to 0.5.

Usually the organic peroxide curing agent and polyvalent metal acrylate or methacrylate are added to the polymer to be cured or vulcanized on a mill or in an internal mixer. Such materials, of course, can be introduced into the polymer in solution, dispersion and the like as is well known. The cure system of this invention is effective in the presence of other compounding materials and agents normally useful with olefin polymers. Such materials include reinforcing agents and fillers such as carbon blacks, metal oxides, clays, silica pigments, accelerators, antioxidants, coloring pigments, plasticizers, process and extending oils, and the like. The cure system of the invention is effective in the presence of petroleum base extending oils.

To demonstrate an advantage of the invention, olefin polymers as described in the Examples I–IV below were compounded to a standard recipe with 100 parts of olefin polymer, 40 parts of high abrasion furnace black, 5 parts of zinc oxide, and dicumyl peroxide and the metal acrylate and methacrylates of the types and amounts indicated in the examples. The compounded materials were vulcanized at 302° F. The resulting physical properties of vulcanizates are recorded as 300% modulus, tensile strength at break, and percent elongation.

Example I

A rubbery copolymer of ethylene and propylene which contained 53 mol percent ethylene was compounded as described above with 3.24 parts of 40% dicumyl peroxide. 60 minutes vulcanizates had a 300% modulus of 100 p.s.i., tensile strength of 470 p.s.i., and an elongation of 795%. Vulcanizates from another compound which contained in addition 3 parts of zinc acrylate had a 300% modulus of 510 p.s.i., tensile strength 1870 p.s.i., and elongation 690%.

Another series of compounds were prepared with 6.5 parts of 40% dicumyl peroxide. Vulcanizates thereof had a 300% modulus of 510 p.s.i., tensile strength of 1290 p.s.i. and elongation of 520%. When the compound included 6 parts of zinc acrylate in addition to the dicumyl peroxide, the 300% modulus was increased to 1350 p.s.i, tensile strength to 2370 p.s.i., and an elongation of 445%. It is obvious from these data that zinc acrylate enhances the cure rate with the organic peroxide and provides vulcanizates of improved physical properties. It is obvious that by use of zinc acrylate the amount of dicumyl peroxide may be greatly reduced while still obtaining vulcanizates having improved physical properties and faster cure rates.

Example II

When the ethylene-propylene copolymer of Example I was compounded with 6.5 parts of 40% dicumyl peroxide and 6 parts of zinc methacrylate, vulcanizates at 60 minutes were obtained having a 300% modulus of 960 p.s.i., tensile strength of 2,007 p.s.i., and elongation of 473%.

Example III

A rubbery interpolymer of ethylene and propylene and 1,4-hexadiene containing 64 mol percent ethylene, and having an iodine number of 13 was compounded to the recipe given above. Vulcanizates at 60 minutes of compounds containing 3.25% of 40% dicumyl peroxide had a 300% modulus of less than 200 p.s.i., tensile strength of 390 p.s.i., and elongation of 1,137%. By adding 5 parts of zinc acrylate to the recipe, vulcanizates were obtained with a higher modulus and tensile strength and lower elongation.

In another compound containing 5 parts of zinc acrylate with 5 parts of dicumyl peroxide with an interpolymer of ethylene and propylene and 1,4-hexadiene which had an iodine number of 15, an increase in 300% modulus from 550 p.s.i. with the peroxide alone to 1,470 p.s.i. with the zinc acrylate and a change in elongation from 590% to 405% was obtained.

Example IV 100 parts of the copolymer of ethylene and propylene of Example I containing 53% ethylene was compounded with 40 parts of HAF black, 6 parts of polyvalent metal acrylate and 2.5 parts of dicumyl peroxide. After curing for 90 minutes at 302° F. the vulcanizates had the following physical properties.

| Metal acrylate | 300% modulus, p.s.i. | Tensile strength, p.s.i. | Elongation, percent |
| --- | --- | --- | --- |
| Iron acrylate | 1,030 | 2,170 | 475 |
| Aluminum acrylate | 1,090 | 2,120 | 440 |
| Cadmium acrylate | 1,150 | 2,270 | 455 |

Vulcanizates of compounds with lead acrylate, barium acrylate and calcium acrylate had increased moduli, tensile strengths, and decreased elongations.

Example V

To demonstrate improved adhesion to metals of olefin polymers containing both the organic peroxide and polyvalent metal acrylate, a series of compounds were prepared with different polymers and polyvalent metal acrylates in varying ratios which were tested for adhesion to unprimed aluminum, brass, steel and zinc. The polymer compounds were sheeted and pressed between .02 inch thick strips of metal, 1″ wide and 6″ long, adhered for 5″, to form a sandwich 0.1″ thick, at 305° F. for 45 minutes at a pressure of 30,000 pounds. The pounds' pull required to peel one of the two adhered metal strips by pulling at one end is recorded along with the percent bond failure.

In Table I below, a copolymer of 52.7% ethylene, 44% propylene and 3.3% ethylidene norbornene, compounded with carbon black, zinc acrylate and dicumyl peroxide in the weight parts shown, was so tested. Run 7 is the control without zinc acrylate.

TABLE I

|  | 1 | 2 | 3 | 4 | 5 | 6 | 7 |
|---|---|---|---|---|---|---|---|
| Copolymer | 100 | 100 | 100 | 100 | 100 | 100 | 100 |
| Zinc acrylate | 5 | 5 | 5 | 5 | 10 | 20 | ----- |
| Dicumyl peroxide | 5 | 3 | 2 | 1 | 1 | 0.5 | 3.33 |
| HAF black | 40 | 40 | 40 | 40 | 40 | 40 | 40 |
| Aluminum: |  |  |  |  |  |  |  |
| Pounds to peel, p.s.i. | 5 | 135 | 93 | 120 | 102 | 97.5 | 2.2 |
| Percent bond failure | 100 | 80 | 1 | 1 | 0 | 0 | 100 |
| Brass: |  |  |  |  |  |  |  |
| Pounds to peel, p.s.i. | 25 | 77 | 100 | 121 | 116 | 112.5 | 1.9 |
| Percent bond failure | 3 | 5 | 0 | 5 | 3 | 0 | 100 |
| Steel: |  |  |  |  |  |  |  |
| Pounds to peel, p.s.i. | 25 | 64 | 113 | 155 | 128 | ----- | 0.3 |
| Percent bond failure | 0 | 0 | (¹) | 0 | 0 | ----- | 100 |
| Zinc: |  |  |  |  |  |  |  |
| Pounds to peel, p.s.i. | 8 | 49 | 88 | 155 | 110 | 75 | 1.75 |
| Percent bond failure | 100 | 70 | 30 | 1 | 25 | 90 | 100 |

¹ Metal broke.

Another copolymer containing 53.7% ethylene, 43% propylene and 3.3% 1,4-hexadiene was compounded in a similar manner and the results obtained set forth in Table II below.

TABLE II

|  | 1 | 2 | 3 | 4 |
|---|---|---|---|---|
| Copolymer | 100 | 100 | 100 | 100 |
| Zinc acrylate | 5 | 10 | 15 | 20 |
| Dicumyl peroxide | 2 | 1 | 0.75 | 0.5 |
| HAF black | 40 | 40 | 40 | 40 |
| Aluminum: |  |  |  |  |
| Pounds to peel, p.s.i. | 79 | 96 | 96 | 102 |
| Percent bond failure | 35 | 15 | 20 | 2 |
| Steel: |  |  |  |  |
| Pounds to peel, p.s.i. | 87 | 99 | 50 | ----- |
| Percent bond failure | 0 | 2 | 70 | ----- |
| Zinc: |  |  |  |  |
| Pounds to peel, p.s.i. | 73 | 94 | 64 | 103 |
| Percent bond failure | 30 | 15 | 90 | 7 |

The above recipe was repeated with an ethylene-propylene copolymer containing 43% ethylene and 57% propylene with 15 parts of magnesium acrylate and one part of dicumyl peroxide. In a test of adhesion to steel as described in the examples above, the pounds of peel was 123 p.s.i. with 1% bond failure. In an adhesion test with zinc, the pounds required to peel was 97 p.s.i.

Example VI

An ethylene-propylene copolymer containing 43% ethylene and 57% propylene was compounded with 40 parts of HAF carbon black, 15 parts of lead(ous) acrylate and one part of dicumyl peroxide per 100 parts of copolymer. Test sandwiches were prepared as described in Example V with aluminum, brass, steel and zinc. The pounds to peel with aluminum was 67 p.s.i., with brass 53 p.s.i., with steel 148 p.s.i., and with zinc 147 p.s.i.

I claim:

1. A process for the production of cured α-olefin polymers which comprises heating at a temperature of about 200 to 500° F. a composition containing a polymer of at least one α-olefin, greater than 0.1 part by weight per 100 parts by weight of α-olefin polymer of an organic peroxide curing agent, and about 1 to 30 weight parts per 100 weight parts of polymer of a polyvalent metal salt of metals of Groups II–A, II–B, III–A, IV–A, IV–B, V–A, V–B, VI–B, VII–B and VIII of the Periodic Table of acrylic acid or methacrylic acid in a ratio of metal acrylate to peroxide of greater than 1.

2. The process of claim 1 wherein the polymer contains ethylene and at least one other α-olefin, 0.5 to 10 parts by weight of the organic peroxide curing agent, and about 1 to 30 weight parts of the polyvalent metal acrylate or methacrylate, per 100 weight parts of an olefin polymer.

3. The process of claim 2 wherein the α-olefin polymer contains ethylene, at least one other α-olefin and a polyene containing 4 to 10 carbon atoms and at least two $>C=C<$ groups, 0.5 to 5 weight parts of the organic peroxide and 1 to 10 weight parts of the polyvalent metal salt of acrylic acid or methacrylic acid per 100 weight parts of olefin polymer and the ratio of salt to peroxide is greater than about 5 to 2.

4. The method of claim 2 wherein the olefin polymer contains a major proportion of ethylene and a lesser proportion of propylene, the organic peroxide is dicumyl peroxide and the polyvalent metal salt is selected from the group consisting of acrylic and methacrylic acid salts of magnesium, calcium, barium, titanium, vanadium, chromium, iron, cobalt, nickel, cadmium, lead, tin, zinc, and aluminum.

5. The method of claim 3 wherein the olefin polymer contains a major proportion of ethylene and a lesser proportion of propylene, the organic peroxide is dicumyl peroxide and the polyvalent metal salt is selected from the group consisting of acrylic and methacrylic acid salts of magnesium, calcium, barium, titanium, vanadium, chromium, iron, cobalt, nickel, cadmium, lead, tin, zinc, and aluminum.

6. A vulcanizable mixture of an α-olefin polymer containing at least one α-olefin, greater than 0.1 weight part per 100 weight parts of olefin polymer of an organic peroxide curing agent and about 1 to 30 weight parts per 100 weight parts of polymer of a polyvalent metal salt of metals of Groups II–A, II–B, III–A, IV–A, IV–B, V–A, V–B, VI–B, VII–B and VIII of the Periodic Table of acrylic acid or methacrylic acid, in a ratio of metal acrylate to peroxide of greater than 1.

7. The vulcanizable mixture of claim 6 wherein the α-olefin polymer contains ethylene and at least one other α-olefin, 0.5 to 10 parts by weight of an organic peroxide, and about 1 to 30 weight parts of the polyvalent metal acrylate or methacrylate per 100 weight parts of an olefin polymer.

8. A vulcanizable mixture of claim 7 wherein the α-olefin polymer contains ethylene, at least one other α-olefin and a polyene containing 4 to 10 carbon atoms and at least two $>C=C<$ groups, about 0.5 to 5 weight parts of the organic peroxide, 1 to 10 weight parts of the polyvalent metal salt of acrylic acid or methacrylic acid and the ratio of metal salt to peroxide is greater than about 5 to 2.

9. The mixture of claim 7 wherein the olefin polymer contains a major proportion of ethylene and lesser proportions of propylene, the organic peroxide is dicumyl peroxide and the polyvalent metal salt is selected from the group consisting of acrylic and methacrylic acid salts of magnesium, calcium, barium, titanium, vanadium, chromium, iron, cobalt, nickel, cadmium, lead, tin, zinc, or aluminum.

10. The mixture of claim 8 wherein the olefin polymer contains a major proportion of ethylene and lesser proportions of propylene, the organic peroxide is dicumyl peroxide and the polyvalent metal salt is selected from the group consisting of acrylic and methacrylic acid salts of magnesium, calcium, barium, titanium, vanadium, chromium, iron, cobalt, nickel, cadmium, lead, tin, zinc, or aluminum.

References Cited

UNITED STATES PATENTS 3,236,917   2/1966   Natta _____ 260—878

JOSEPH L. SCHOFER, Primary Examiner

R. S. BENJAMIN, Assistant Examiner

U.S. Cl. X.R.

260—88.2, 93.7, 94.9